B. F. Bee.

Hydrometer.

No. 2,347. Reissued Sept. 4, 1866.

Witnesses;
W. G. Bennem
F. W. Wurster.

Inventor;
Benjamin F. Bee
by his Attorney
E. S. Renwick

UNITED STATES PATENT OFFICE.

BENJAMIN F. BEE, OF HARWICH, MASSACHUSETTS.

IMPROVEMENT IN SALINOMETERS.

Specification forming part of Letters Patent No. 51,912, dated January 9, 1866; Reissue No. 2,347, dated September 4, 1866.

*To all whom it may concern:*

Be it known that I, BENJAMIN F. BEE, of Harwich, in the county of Barnstable, in the State of Massachusetts, have invented a new and Improved Salinometer, to be used in testing the density of the water in marine boilers; and I do hereby declare that the following is a full, clear, and exact description of the construction and operation of the same, reference being had to the accompanying drawings, making a part of this specification, in which—

Figure 1:
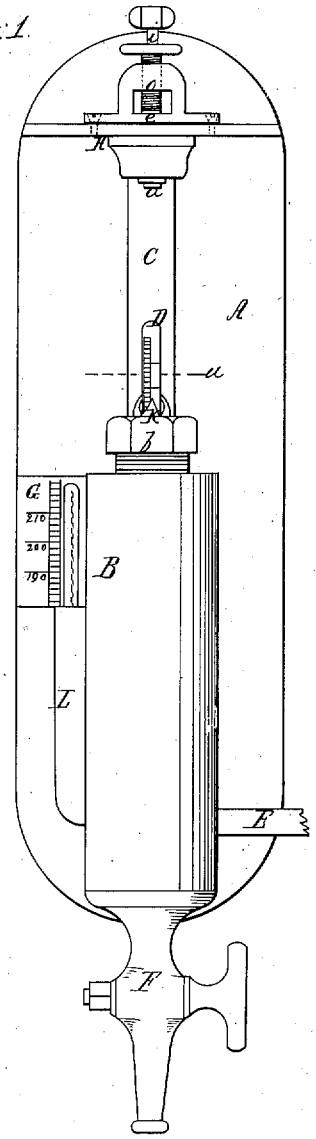
Figure 2:
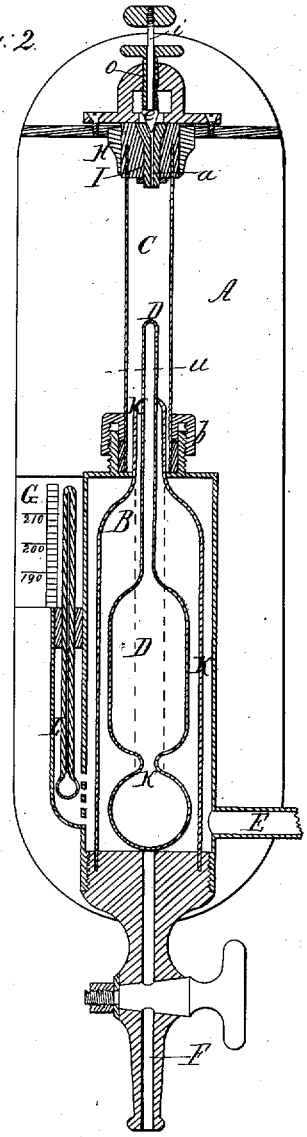

Figure 1 is a front elevation, and Fig. 2 a vertical section, of a salinometer embodying my invention.

Previous to my invention it has been customary to construct salinometers with float-vessels open at their upper ends, so that the stem of the float, or "salinometer-glass," as it is commonly called, used to indicate the density of the liquid could be seen by looking into the open top of the vessel. This mode of construction is attended with many disadvantages, the most prominent of which are the following: The hot water from the boiler exhales steam, which, escaping from the open top of the salinometer-vessel, renders it difficult for the operator to note the indications of the instrument, and as the water-level is necessarily below the top of the vessel, this position increases the difficulty of noting the indications. Moreover, the apparatus can be used only in a place such as the boiler-room, where the escaping steam will produce no substantial injury, and the instrument can be used with convenience only at intervals.

The object of my invention is to obviate the defects of preceding apparatus of this kind; and it consists of the combination of a float so constructed as to indicate the density of the fluid, with a closed vessel constructed in whole or in part of glass, so that the indications of the float may be noted by looking through the transparent vessel without the necessity of looking into an opening in the vessel and without any attendant escape of steam.

My invention consists, further, of certain combinations of the said float and closed vessel with other instrumentalities which enable the apparatus to be conveniently applied and used.

The accompanying drawings represent a salinometer embodying my invention. In it the salinometer-vessel is composed in part of metal and in part of glass, a part of the vessel being formed of a metal chamber or cylinder which contains the salinometer float or glass, and a part being formed of a glass tube to receive and permit the inspection of the stem of the glass by looking through, instead of into, the vessel.

A in the figures is a piece of metal serving as a stock or bed, to which are attached the several parts of the apparatus. It should be of such thickness and rigidity as not to bend or spring easily, in order to preserve the glass tube C from liability to leakage or fracture.

B is a metal cylinder of sufficient capacity to contain the salinometer-glass D in common use and of sufficient strength to resist the pressure employed in the boiler to which it may be attached. This cylinder is fitted at top with a stuffing-box having a screwed gland, *b*, to receive and hold the lower end of the glass tube C.

The hole in the bottom of the stuffing-box should be smaller than the exterior of the glass tube, so as that latter is supported by the bottom of the stuffing-box.

E is the pipe for conducting the water to be tested from the boiler to the cylinder B, and is fitted with a cock, for the purpose of controlling the flow of water into the apparatus.

F is the outlet or waste pipe, fitted with a cock for controlling the flow of water from the apparatus.

G is a thermometer, the bulb of which is in communication with the water in the cylinder and indicates the temperature of the water tested. This thermometer is secured in a case, L, which communicates with the interior of the cylinder B by perforations. The stem of the thermometer projects through the upper end of its case L, so that the level of the mercury may be seen; and the aperture through which the stem projects is closed by packing (such as a piece of india-rubber) to prevent the escape of the liquid from the case.

H is a case containing a block of vulcanized rubber, I. This rubber is penetrated about three-fourths of its depth by an annular groove for receiving the upper end of the glass tube C. The rubber I is also penetrated at the center by the small tube *a*, at the top of which is a small conical valve, *e*, for regulating and preventing the escape of the air from the glass tube and cylinder. As it is necessary that the valve *e* should close perfectly tight, it is so constructed as to be readily reground or cleared in case of any leakage or obstruction. For this purpose the valve-stem *i* is made separate from the screw-sleeve *o*, so that it may revolve freely without progressing in either direction, and it is opened and closed by the screw-sleeve *o*.

K is a light frame-work, serving as a guide for keeping the salinometer-glass in a central position in the vessel. It terminates at the top in several small points to lessen the friction and allow the glass to slide freely between them.

The operation of the apparatus is as follows: Commencing with the closed vessel, composed of the glass tube C and cylinder B, free of water and filled with atmospheric air at its ordinary pressure, close the valve *e* and the waste-cock F. When this is done allow the water from the boiler to flow into the closed vessel through the pipe E by opening the cock between the salinometer and the boiler. The air contained in the closed vessel will be compressed into the tube C and upper portion of the cylinder B, more or less, according to the pressure in the boiler; but the quantity of air contained in the closed vessel will not be sufficiently compressed by the pressure usually carried in marine boilers to allow the water to appear in the glass tube. Now open the valve *e*, and allow the air to escape until the water rises to about *n*, where the water-level is in plain view of the operator, and when it rises to this point close the valve *e*. The salinometer-glass already contained in the cylinder will rise with the water and remain suspended, with its stem protruding more or less above the water-level in the glass tube, according to the saturation and temperature of the water. At the first filling of the cylinder the water will not remain of the temperature at which the salinometers are usually graduated; but by opening the water-cock and allowing the water to escape slowly, the communication with the boiler remaining open, the water in the apparatus may be brought to any temperature desired.

If it be desirable that the apparatus should operate without intermission, so as to indicate the saturation continuously, nothing more is necessary than to adjust the waste at F, so that the temperature of the apparatus shall be constantly maintained at the same point by a continuous flow of water from the boiler through the apparatus.

If by any means the air in the glass tube escapes, it may be recharged by shutting off the supply from the boiler, permitting the water in the apparatus to escape, and repeating the process of starting, as before stated.

The advantage of this apparatus over others used for the same purpose (some of which are denominated "constant") are that by testing the water in a closed vessel we avoid all the nuisance of escaping steam, the liability to scalding, and any manipulating of the salinometers and thermometers by which great quantities of those articles are constantly broken. For the same reason the apparatus may be placed at a greater distance from the boiler than the open case, and a very slight flow through it is necessary to maintain the temperature and keep the water in the closed vessel of the same density as that in the boiler. Moreover, as the vessel is closed, the apparatus may be placed in the state-rooms or other parts of a steamer in which the ordinary salinometers could not be used with advantage on account of the escape of steam from them.

I am aware that a closed transparent vessel has been used in connection with a float constructed to indicate the height of water therein, the whole constituting a water-gage, and therefore I do not claim, broadly, the combination of a closed transparent vessel with a float of every description; but

What I claim as my invention, and desire to secure by Letters Patent, is—

1. The combination, in a salinometer, of the closed transparent vessel for containing the liquid to be tested and a float for indicating the density of the liquid, these two operating substantially as set forth.

2. The combination, in a salinometer, of the following instrumentalities, viz: the closed transparent vessel, salinometer-float, supply-pipe, and escape-pipe, all operating in the combination substantially as set forth.

3. The combination, in a salinometer, of the following instrumentalities, viz: the closed vessel, supply-pipe, escape-pipe, and air-valve at the top of the vessel, all operating in the combination substantially as set forth.

4. The combination, in a salinometer, of the following instrumentalities, viz: the closed vessel, salinometer-float, and guide for the salinometer-float, all operating substantially as set forth.

5. The combination, in a salinometer, of the following instrumentalities, viz: the closed vessel and closed case, communicating therewith, for the thermometer, both operating substantially as set forth.

6. The combination, in a salinometer, of the following instrumentalities, viz: the closed vessel, salinometer-float, and thermometer, all operating substantially as set forth.

7. The combination, in a salinometer, of the closed vessel with an escape-valve having the valve and screw independent of each other, so that the valve may be turned upon its seat to tighten the joint, substantially as set forth.

In testimony whereof I have hereunto set my hand this 16th day of May, A. D., 1866.

BENJAMIN F. BEE.

Witnesses:

WM. H. UNDERWOOD,
JONATHAN B. YOUNG.